United States Patent

Behr

[11] Patent Number: 5,558,370
[45] Date of Patent: Sep. 24, 1996

[54] ELECTRONIC SEAT BELT TENSIONING SYSTEM

[75] Inventor: Leonard W. Behr, White Lake, Mich.

[73] Assignee: Automotive Systems Laboratory, Inc., Farmington Hills, Mich.

[21] Appl. No.: 413,601

[22] Filed: Mar. 30, 1995

[51] Int. Cl.$^6$ .................. B60R 22/44; B60R 22/46; B60R 22/48

[52] U.S. Cl. .............. 280/806; 280/807; 242/390.1; 242/390.8; 242/374; 340/457.1; 340/668

[58] Field of Search .................. 280/807, 806; 242/390.1, 390.8, 390, 374, 534.2; 340/457.1, 668; 297/475, 480; 180/282

[56] References Cited

U.S. PATENT DOCUMENTS

| | | | |
|---|---|---|---|
| 3,375,495 | 3/1968 | Burns | 340/668 |
| 3,815,086 | 6/1974 | Minton et al. | 340/457.1 |
| 3,991,953 | 11/1976 | Takada | 242/107.4 A |
| 4,655,312 | 4/1987 | Frantom et al. | 280/807 |
| 4,659,108 | 4/1987 | Sack et al. | 280/807 |
| 4,714,274 | 12/1987 | Nagashima | 280/801 |
| 4,789,185 | 12/1988 | Fohl | 280/806 |
| 4,840,324 | 6/1989 | Higbee et al. | 242/107.6 |
| 4,848,795 | 7/1989 | Muraishi et al. | 280/801 |
| 5,076,609 | 12/1991 | Park | 280/804 |
| 5,087,075 | 2/1992 | Hamaue | 280/806 |
| 5,131,594 | 7/1992 | Refior et al. | 242/107 |
| 5,149,133 | 9/1992 | Alvarado | 280/804 |
| 5,181,739 | 1/1993 | Bauer et al. | 280/807 |
| 5,186,063 | 2/1993 | Nishizawa | 74/2 |
| 5,397,075 | 3/1995 | Behr | 242/374 |

FOREIGN PATENT DOCUMENTS

| | | |
|---|---|---|
| 0502370A1 | 9/1992 | European Pat. Off. . |
| 2914235A1 | 10/1979 | Germany . |
| 3149573A1 | 6/1983 | Germany . |
| 3600650A1 | 7/1987 | Germany . |
| 1540979 | 2/1979 | United Kingdom . |

*Primary Examiner*—Anne Marie Boehler
*Assistant Examiner*—Peter C. English

[57] ABSTRACT

A method and system (10) for controlling the tensioning of a vehicle seat belt utilizes a control processor (20) and a motor (12) to provide initial tensioning of the seat belt. After initial tensioning, the control processor (20) removes substantially all tension on the seat belt while continuously monitoring seat belt pay out via an encoder (18). The system provides out-of-position warnings, and is responsive to vehicle acceleration information from a crash discrimination system (22) and/or an object detecting radar system (26) to control tensioning of the seat belt. The system further provides for earlier seat belt tensioning activation by utilizing a pyrotechnic pretensioner (32) having a replaceable pyrotechnic cartridge (38).

9 Claims, 3 Drawing Sheets

5,558,370

ELECTRONIC SEAT BELT TENSIONING SYSTEM

BACKGROUND OF THE INVENTION

The present invention generally relates to a vehicle passenger seat belt system, and more particularly a seat belt system which provides enhanced passenger comfort through electronic belt tension control.

Generally, known seat belt systems typically combine a tensioner and a pretensioner to control seat belt tension. Typical belt tensioners operate by exerting a constant belt tension through spring loading. The spring biasing is designed to partially remove slack to keep the belt snug against the occupant's chest, while not tensioning the belt hard enough to overcome the slack caused by heavy clothing. Because the belt tension is constantly applied, the belt tension exhibited by typical tensioners tends to be an irritant which may cause some occupants not to wear belts, or to otherwise arrange a manner of tension relief which defeats the function of the chest-restraint belt because of the creation of excessive slack.

Known pretensioner arrangements have also proven to be unsatisfactory. More specifically, typical seat belt pretensioners are usually in the form of a pyrotechnic device which utilizes an explosive gas generator to activate and power a mechanism which winds up the slack in the lap and chest belts. However, typical seat belt pretensioners have limited ability to reel in belt length, because winding depends on the force and stroke of a piston activated by the pyrotechnic device. Therefore, if as noted above the belt has been extended to relieve irritation, the problems of known belt tensioning systems is compounded by the fact that the pretensioner may be unable to take up sufficient length to afford optimum occupant protection.

In addition to the above described deficiencies, known occupant restraint systems are unable to remind occupants that they are out of optimal position to receive protection from the vehicle occupant restraint system.

SUMMARY OF THE INVENTION

It is therefore an object of the present invention to provide an improved seat belt tensioning system which provides a tensionless state during noncritical situations.

It is a further object of the present invention to provide an improved seat belt tensioning system which electronically controls the seat belt tension based on sensed vehicle acceleration, detection of potentially impacting objects, and/or occupant position relative to fixed structure within the vehicle.

It is another object of the present invention to provide a seat belt tensioning system which utilizes a reusable pyrotechnic pretensioner to reduce the cost and complexity of servicing the pretensioner after an actuation, thereby obviating cost disincentives to lowering triggering threshold levels.

It is another object of the present invention to provide a seat belt tensioning system which electrically controls the seat belt tension to create a substantially tensionless normal mode of operation with a reliable, low threshold tensioning capability.

It is another object of the present invention to provide a seat belt tensioning system which utilizes the output of an external radar system to anticipate potential vehicle impacts and thereby trigger early tensioning of the seat belt.

In accordance with the present invention, a method and system for controlling the tension of a seat belt used in a vehicle comprises the steps of detecting deployment of the seat or shoulder belt from a wound condition, determining the amount of belt which is unwound, and activating a winding means to incrementally rewind the belt after a belt buckle is coupled until a first predetermined tensive force is exhibited by the seat belt on the occupant. The amount of belt which is incrementally rewound is tracked after which the winding means is deactivated to substantially release the tensive force exhibited by the seat belt on the occupant, thereby placing the seat belt in a tensionless state. While the belt is in the tensionless state, the present invention provides for continuously monitoring the amount of belt unwound responsive to occupant movement, compares the monitored amount of belt unwound to a predetermined pay out value, generates an occupant out-of-position alarm and reapplies tension if the monitored amount exceeds the predetermined value. In addition, the present invention also continuously monitors vehicle acceleration, determines whether the vehicle acceleration has exceeded a first threshold value, and activates the winding means to rewind the seat belt until a second predetermined tensive force greater than the first predetermined tensive force is exhibited on the occupant if the first threshold value has been exceeded. When the vehicle acceleration falls back below the first threshold value, the winding means is deactivated after a short delay to release the tensive force exhibited by the seat belt. The present invention further determines whether the vehicle acceleration has exceeded a second threshold value greater than the first threshold value, and triggers a pretensioner means if the second threshold has been exceeded. The pretensioner rewinds the seat belt with a third predetermined tensive force greater than the second predetermined force generated by the winding means.

In further accordance with the present invention, the pretensioner means for rewinding the vehicle seat belt with the third predetermined tensive force can be advantageously implemented comprising a replaceable pyrotechnic cartridge, a means for igniting the replaceable pyrotechnic cartridge in response to detection of the predetermined vehicle acceleration condition, and an actuator means coupled to the winding means for actuating the winding means when the pyrotechnic cartridge is ignited. After ignition, only the pyrotechnic cartridge requires replacement if the crash energy was low enough that the belt system would not be damaged.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
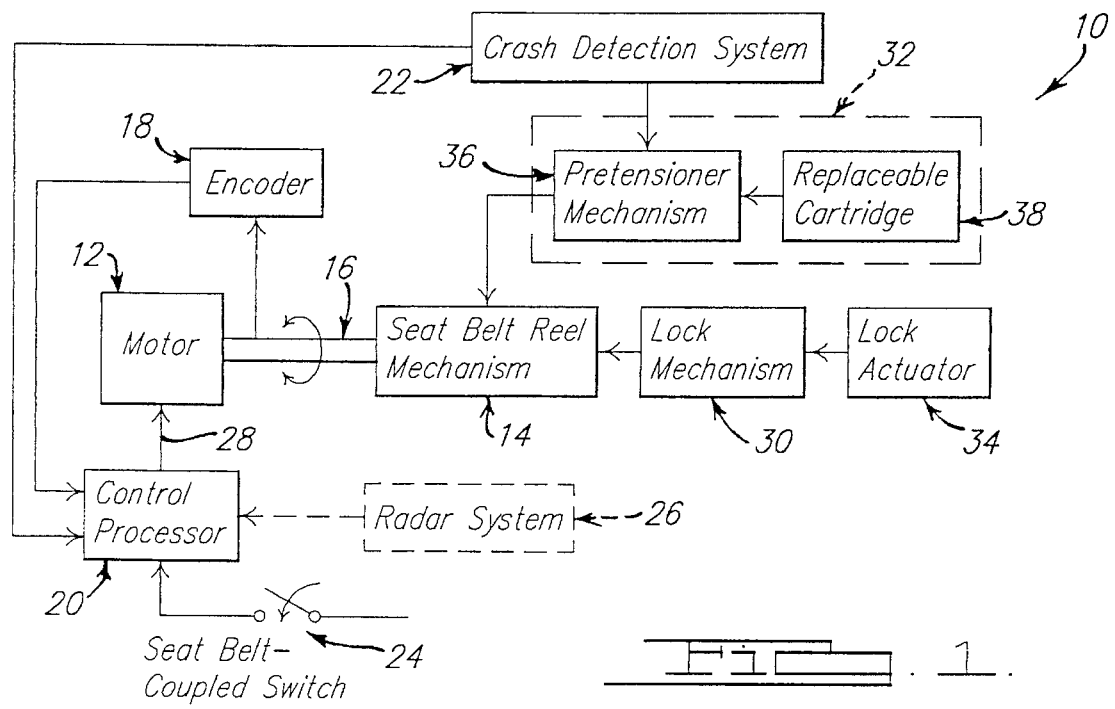
FIG. 1 is a block diagram of an electronic seat belt tensioning system in accordance with the present invention.

Referring to FIG. 1, there is shown an electronic seat belt tensioning system 10 in accordance with the present invention having a motor 12, such as a step motor, coupled to seat belt reel mechanism 14 via a motor shaft 16. The seat belt can be a lap belt and/or a shoulder belt. A shaft-encoder 18 is coupled to the shaft 16 to provide a quantified output of the amount and direction of shaft rotation for a control processor 20. In accordance with one feature of the present invention, the motor 12 and shaft-encoder 18 obviate the need for a conventional spring-biased tensioner such as used in typical seat belt tensioners. One of ordinary skill in the art will readily appreciate that shaft encoders are generally known, and that the shaft-encoder 18 can be arranged with two channels or an absolute position read out to provide the necessary directional information and the position counts, and the belt reel mechanism 14 can be designed for easy replacement separate from the motor 12 and shaft-encoder 18 assembly, so that either may be replaced or serviced without affecting the other.

The control processor 20 receives inputs from the shaft-encoder 18, an external vehicle crash discrimination system 22, a seat belt-coupled switch 24, and an optional external radar system 26. The control processor 20 analyzes the input data to control actuation of the motor 12 via a control line 28, thereby controlling the operation of the seat belt reel mechanism 14 to regulate the seat belt tension. The overall operation of the controller 20 and the system 10 is more fully described hereinbelow with reference to FIG. 2.

In addition to control processor 20, operation of the seat belt reel mechanism 14 is further controlled by a locking mechanism 30 and a reusable pyrotechnic actuator/pretensioner 32. The locking mechanism functions as an "anti-pay out" brake which is responsive to a g force activated and/or belt tension activated lock actuator 34 to lock movement of the reel mechanism 14, thereby maintaining the seat belt in its most tensioned position for the duration of an emergency or above threshold g force event. The reusable pyrotechnic actuator 32 is configured to augment the tensioning motor 12 during critical emergency/crash situations. A more detailed description of a suitable reusable pyrotechnic actuator can be found in commonly owned U.S. Pat. No. 5,397,075 to Behr, and incorporated by reference herein. For illustrative purposes, the actuator 32 is shown in FIG. 1 as consisting of a mechanical drive mechanism 36 and a replaceable pyrotechnic cartridge 38.

Figure 2:
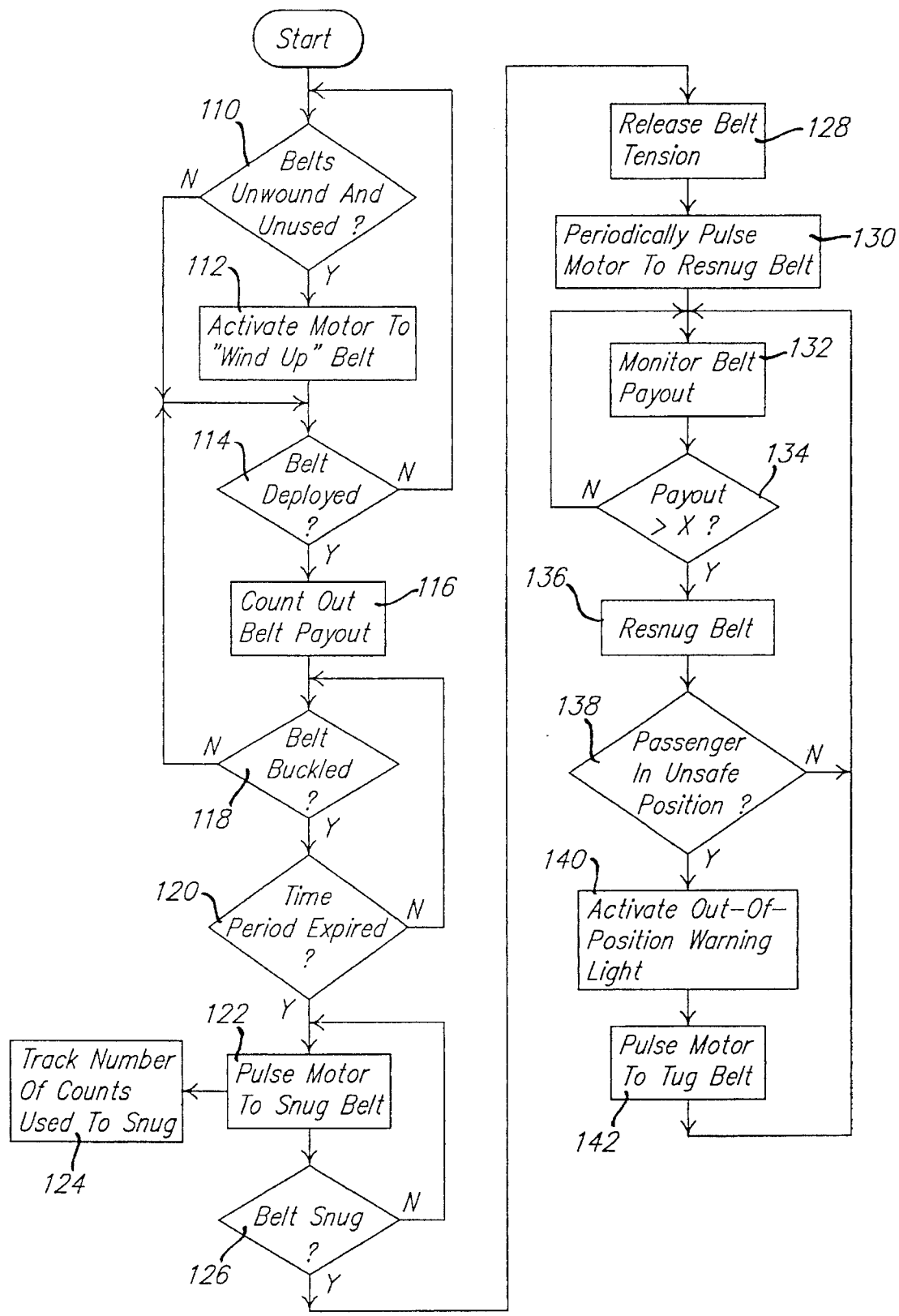
FIG. 2 is a flow diagram illustrating the normal tensioning control operation of the present invention.

Referring to FIG. 2, there is shown a flow diagram illustrating the belt tensioning operation of the present invention in normal, nonemergency situations. The system 10 derives power from either a vehicle interior lamp circuit (or other line not controlled by the ignition switch), and/or an ignition line. At step 110, the control processor 20 monitors the shaft-encoder input and the belt-coupled switch 24 input to determine whether the seat belt is unwound and/or unused. If the belt is unwound and/or unused, the processor 20 activates the motor 12 to wind the seat belt back onto the belt reel mechanism 14 at step 112. Any existing vehicle circuit which is activated by a vehicle door being opened can be used to initiate a "housekeeping" operation if the vehicle is entered, belts are unwound but unused, and the vehicle is exited without being started. The motor 12 provides a nominal winding tension which retracts the belt to the stored position. This tension can be overcome as the occupant unwinds and buckles the belt.

As the belt is deployed, the shaft-encoder allows the electronic control processor 20 to detect deployment of the belt (step 114) and to count off the amount of belt paid out during the deployment process at step 116. When the belt is buckled at step 118, the retracting force remains and the control process 20 counts off the amount of belt retracted. In further accordance with the present invention, the amount of belt paid out can be used by the processor to determine whether an occupant is actually present, which information can be used to supplement a separate external occupant position sensing system.

After a certain time period during which the retracting force is applied (step 120) or after cessation of down-counts, the motor 12 is activated or pulsed at a higher power level (step 122) to snug the belt tension. This "snugging" tension would be felt by the occupant as a series of gentle tugs. During these tugs, the winder would continue to wind in the belt while the processor 20 tracks the counts (step 124).

After removal of excess slack from the belt (step 126), the winding tension applied by the motor would be substantially reduced to zero (step 128). Thus, the belt would be in a tensionless state during normal use so that the occupant would not be irritated by continuous belt tension such as exhibited with typical spring-loaded belt retractors. The amount of belt paid out is continuously tracked, with several counts of belt pay out being tolerated without restoring belt tension. If minor occupant motions cause additional belt to be unwound over what the system tolerates, the system will wind back the belt to the previously stored position.

Periodically, the controller will cause the motor 12 to apply a low level of tensioning (step 130) to re-initialize tensioning, thereby preventing the system from erroneously determining the occurrence of an excess pay out due to improper initial tensioning, such as caused by the occupant leaning back during the tension initialization procedure. The processor 20 continues to monitor the belt pay out (step 132), and if more than a few pay out counts are detected (step 134), this information can be advantageously output for use by a separate occupant position sensing system. After a predetermined pay out is exceeded, the retracting tension would be activated at step 136, thereby effectively pretensioning the belt and providing a reminder to the occupant to return to a "normal" seating position.

In further accordance with the present invention, if a separate, external occupant position sensing system determined that the occupant was in an unsafe seating position (step 138), the tensioning system 10 will illuminate a warning lamp at step 140, and cause the retracting tension to increase to a higher level than the above described snugging process to attract the attention of the occupant (step 142). Such a higher tensioning would create a "tugging" process on the occupant.

Figure 3:
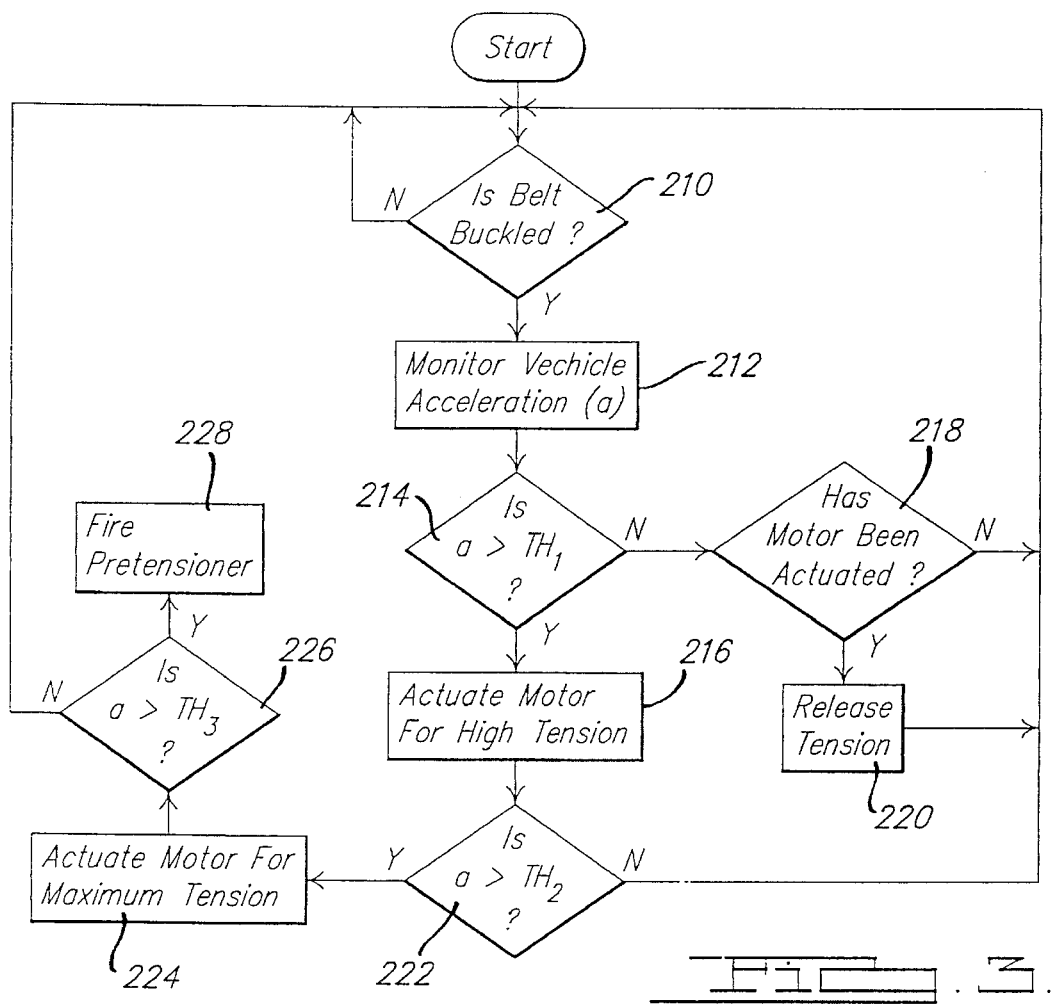
FIG. 3 is a flow diagram illustrating the emergency tensioning control operation in accordance with a first embodiment of the present invention.

Referring to FIG. 3, there is shown a flow diagram illustrating the belt tensioning operation of the present invention during hard braking, emergency, and/or collision situations. After the system 10 initially determines that the belt has been deployed and buckled at step 210, the system continuously monitors data representative of the vehicle's acceleration at step 212, such as generated by an algorithm based vehicle crash discrimination system. The monitored data can be representative of vehicle acceleration, velocity and/or a jerk value (i.e., slope of the acceleration data), and can be generated by an algorithm-based crash discrimination system which utilizes silicon machined accelerometers and/ or occupant position sensing apparatus, such as taught in commonly owned U.S. Pat. Nos. 5,363,302 to Allen et al, 5,337,238 to Gioutsos et al, and/or U.S. patent application Ser. Nos. 08/048,366, now U.S. Pat. No. 5,446,661 to Gioutsos et al, and 08/181,616 to Gioutsos et al, all of which are incorporated by reference herein.

The acceleration (a) data is compared to a first threshold value $TH_1$ (step 214) and if $TH_1$ is exceeded, the motor 12 is actuated to apply a high level retracting force to the seat belt (step 216). The threshold value $TH_1$ is approximately equal to a 0.3 g force event, or to otherwise be commensurate with a nonpanic braking situation. If the acceleration data falls below $TH_1$, then the processor determines whether the motor 12 has been actuated at step 218. If the motor was actuated, the motor is deactivated to release the high tension on the belt at step 220.

In further accordance with the present invention, the tensioning operation is provided with an ability to retract the belt with a higher, maximum level of tension in more critical situations. More specifically, the acceleration data is compared to a second threshold value $TH_2$ at step 222, wherein $TH_2$ could be a value substantially approximating a 0.6 g force event or other suitable algorithmic measure. If $TH_2$ is exceeded, the motor 12 is actuated to apply the motor's maximum possible torque to retract the belt at step 224. Since the processor 20 is continuously monitoring the acceleration data, the level of belt tension being applied is always released any time the acceleration data falls below the appropriate threshold level.

In the event of a major deceleration, such as the acceleration data exceeding a third threshold valve $TH_3$ (step 226) set approximately equal to a level required to close a safing sensor in a crash discrimination system, or at a higher level determined by the crash discrimination algorithm, the pyrotechnic actuator/pretensioner 32 would be triggered at step 228. This would provide a final tensioning of the belt system prior to a vehicle impact. In accordance with one of the features and advantages of the present invention, this could occur for crash events of less velocity than normally used as a threshold for deploying an air bag, because the pretensioner 32 is reusable with only minor maintenance, i.e., replacement of cartridge 38. In other words, costly damage to the vehicle or the restraint system 10 does not occur, and therefore there is no penalty for an early actuation of the pretensioner 32. If the crash event is harsh enough to stretch the belt webbing as determined by the crash algorithm and/or the exceeding of a predetermined deceleration threshold level, the crash event and/or data would be noted in a crash record of the crash discrimination system, and a service warning lamp would be lit.

Triggering at a lower level is particularly advantageous because of the protection provided for lower-level crash events, thereby allowing the seat belt to operate over a longer time period in the case of high speed crash events. Lower threshold triggering may also allow the pyrotechnic pretensioner to use a slower gas generation rate than known units, thereby reducing chest slap caused by the belt quickly tensioning.

During post-ignition servicing, the cartridge 28 for the pretensioner 32 is replaced and the belt webbing is visually inspected for stretching. The belt webbing is replaced if stretching is noted or if the service warning lamp and diagnostic message indicates sufficient crash severity. Replacement typically will not be necessary as a result of low-speed deployments.

Figure 4:
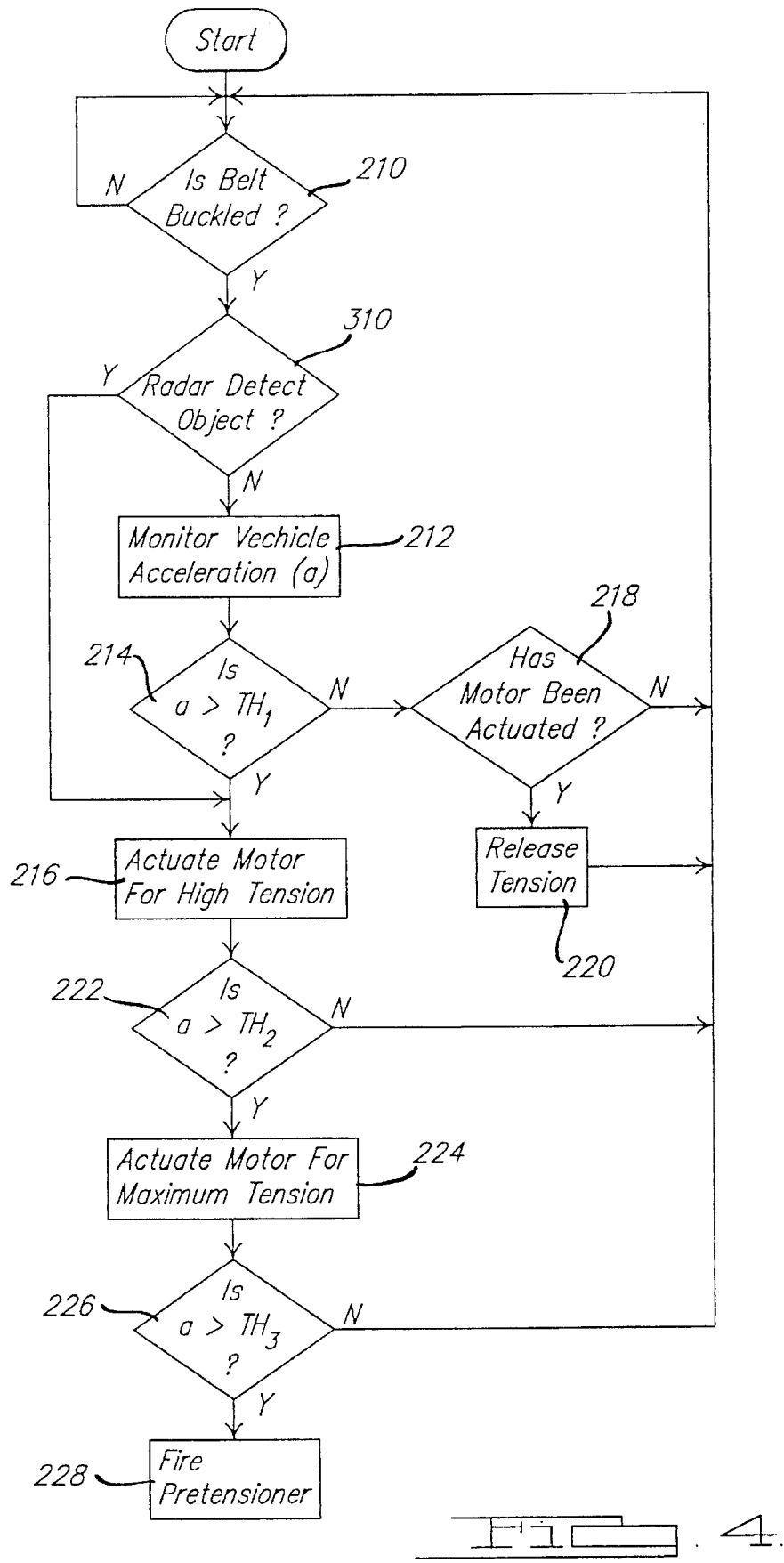
FIG. 4 is a flow diagram illustrating the emergency tensioning control operation in accordance with a second embodiment of the present invention.

FIG. 4 shows a further embodiment of the present invention incorporating an input from the optional object detecting radar system 26 to the system operation as described above in context with FIG. 3. Like elements and operational steps are designated with identical reference numbers. As shown at step 310, the independent, on-board radar system 26 scans the physical surroundings of the vehicle to detect the presence of objects/obstructions, and to otherwise predict impending collisions in response thereto. The radar system 26 can be of conventional design and implemented in a manner known to one having ordinary skill in the art since the particulars of the radar system are not critical to the present invention. If the radar system 26 provides a signal predicting an impending impact, the processor can provide early actuation of the motor 12 to begin retracting the seat belt with a high tension (step 216) a second or two prior to the anticipated crash. If the crash never occurs, such as evidenced by the vehicle acceleration never exceeding any of the threshold values, the belt tension will be released. The tugging process provided in response to the radar system not only provides enhanced occupant safety due to early belt tensioning, but also functions as a tactile warning signal to the occupant (i.e., the driver) to thereby potentially assist the driver in implementing defensive driving measures or to otherwise avoid the impending collision.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A method of controlling the tension of a vehicle seat belt comprising the steps of:

detecting deployment of said seat belt from a wound condition to an unwound condition;

determining the amount of seat belt which is unwound;

activating a winding means to incrementally rewind the seat belt until a first predetermined tensive force is exhibited by the seat belt on a vehicle occupant;

deactivating the winding means to substantially release the first predetermined tensive force exhibited by the seat belt on the occupant to place the seat belt in a substantially tensionless state;

continuously monitoring the amount of seat belt unwound while in the tensionless state;

comparing the monitored amount of seat belt unwound to a predetermined pay out value;

generating an out-of-position alarm if the monitored amount exceeds the predetermined pay out value;

continuously monitoring vehicle acceleration;

determining whether the vehicle acceleration has exceeded a first threshold value;

if the first threshold value is exceeded, activating the winding means to rewind the seat belt until a second predetermined tensive force is exhibited on the occupant;

deactivating the winding means to release the second predetermined tensive force exhibited by the seat belt if the vehicle acceleration falls back below the first threshold value;

determining whether the vehicle acceleration has exceeded a second threshold value greater than the first threshold value;

triggering a pretensioner means if the second threshold value has been exceeded, said pretensioner means rewinding said seat belt with a third predetermined tensive force greater than the second predetermined force generated by the winding means.

2. The method of claim 1 wherein said step of continuously monitoring the amount of seat belt unwound while in the tensionless state further comprises the step of periodically activating said winding means to incrementally rewind the seat belt until the first predetermined tensive force is exhibited by the seat belt on the occupant.

3. The method of claim 1 wherein said step of generating an out-of-position alarm further comprises the step of activating said winding means to incrementally rewind the seat belt until the amount of unwound seat belt is less than the predetermined pay out value.

4. The method of claim 1 further comprising the steps of receiving a signal indicative of a potential impact between the vehicle and an object, and activating said winding means to incrementally rewind the seat belt until the second predetermined tensive force is exhibited by the seat belt on the occupant.

5. The method of claim 4 wherein said signal indicative of a potential impact is generated by a radar system.

6. The method of claim 1 wherein said step of triggering a pretensioner means further comprises the steps of recording data representative of vehicle crash severity, and generating a service warning if the vehicle crash data is representative of a predetermined severity of crash.

7. The method of claim 6 wherein said service warning indicates a need to replace the seat belt because of potential stretching.

8. The method of claim 1 wherein said pretensioner means comprises a replaceable pyrotechnic cartridge, and said triggering step comprises the step of igniting said replaceable pyrotechnic cartridge.

9. A vehicle seat belt tension control system comprising:

a control means coupled to a seat belt tensioning mechanism, said control means comprising:

a processor means for monitoring a predetermined condition of the vehicle;

an electric motor coupled to said seat belt tensioning mechanism for adjusting the tension of said seat belt based on the monitored vehicle condition;

means for detecting seat belt payout;

means responsive to said pay out detecting means for detecting an unsafe occupant seating condition; and a tactile warning means coupled to said seating condition detection means and said control means for alerting the occupant to a detected unsafe seating condition by causing said electric motor to momentarily increase the seat belt tension to tug on the occupant; and a pretensioner means connected to the seat belt tensioning mechanism for tensioning the seat belt in response to a detected emergency vehicle condition, said pretensioner means comprising a replaceable pyrotechnic cartridge.

\* \* \* \* \*